United States Patent
Leng et al.

(10) Patent No.: US 12,163,027 B2
(45) Date of Patent: Dec. 10, 2024

(54) NITRILE RUBBER CONDOMS AND METHODS OF MAKING THEM

(71) Applicant: Karex Holdings Sdn. Bhd., Selangor (MY)

(72) Inventors: Fook Peng Leng, Selangor (MY); Yi Yee Loh, Selangor (MY); Lai Peng Lim, Selangor (MY)

(73) Assignee: KAREX HOLDINGS SDN. BHD., Selangor (MY)

( * ) Notice: Subject to any disclaimer, the term of this patent is extended or adjusted under 35 U.S.C. 154(b) by 113 days.

(21) Appl. No.: 17/813,785

(22) Filed: Jul. 20, 2022

(65) Prior Publication Data

US 2024/0026131 A1    Jan. 25, 2024

(51) Int. Cl.
| | |
|---|---|
| C08L 9/02 | (2006.01) |
| B29C 41/00 | (2006.01) |
| B29C 41/14 | (2006.01) |
| B29K 19/00 | (2006.01) |
| B29L 31/00 | (2006.01) |

(52) U.S. Cl.
CPC .............. *C08L 9/02* (2013.01); *B29C 41/003* (2013.01); *B29C 41/14* (2013.01); *B29K 2019/00* (2013.01); *B29L 2031/7538* (2013.01); *C08L 2201/08* (2013.01); *C08L 2312/00* (2013.01)

(58) Field of Classification Search
CPC .... C08L 9/02; C08L 2201/08; C08L 2312/00; B29C 41/003; B29C 41/14; B29K 2019/00; B29L 2031/7538; C08K 5/13; C08K 5/39; C08K 5/0025; C08K 5/005; C08K 2003/2296; C08K 3/08; C08K 3/22
See application file for complete search history.

(56) References Cited

U.S. PATENT DOCUMENTS

| | | | | |
|---|---|---|---|---|
| 4,250,071 | A * | 2/1981 | Perrey | C08C 1/145 |
| | | | | 524/265 |
| 6,391,409 | B1 * | 5/2002 | Yeh | B29C 41/003 |
| | | | | 428/521 |
| 2012/0021155 | A1 * | 1/2012 | Chen | B29C 41/22 |
| | | | | 433/136 |
| 2017/0218142 | A1 | 8/2017 | Foo et al. | |
| 2019/0029342 | A1 * | 1/2019 | Foo | A61B 42/10 |

FOREIGN PATENT DOCUMENTS

| | | |
|---|---|---|
| CN | 111253639 A | 6/2020 |
| DE | 2756774 A1 | 6/1979 |
| EP | 2020427 A1 | 2/2009 |
| PL | 2585289 T3 | 1/2024 |
| WO | 2009/019554 A1 | 2/2009 |

OTHER PUBLICATIONS

International Search Report received for PCT Patent Application No. PCT/MY2022/000007, mailed on Mar. 20, 2023, 4 pages.

* cited by examiner

*Primary Examiner* — Robert C Boyle
(74) *Attorney, Agent, or Firm* — ArentFox Schiff LLP

(57) ABSTRACT

This invention provides a method of making an elastomeric article, and the method comprises dipping a mold into a first dip tank containing a compounded nitrile rubber formulation to produce an elastomeric film layer on the mold, the compounded nitrile rubber formulation comprising nitrile butadiene copolymer; a crosslinking agent; a metal oxide; a vulcanization accelerator; an antioxidant; an alkali agent; and a heat sensitizer; then drying and curing the elastomeric film layer to form the elastomeric article. The heat sensitizer may be an organopolysiloxane. Elastomeric articles prepared according to this invention may have a film thickness in a range of 0.020 mm to 0.050 mm; such films are suitable for medical examination gloves, surgical gloves, or condoms.

19 Claims, 1 Drawing Sheet

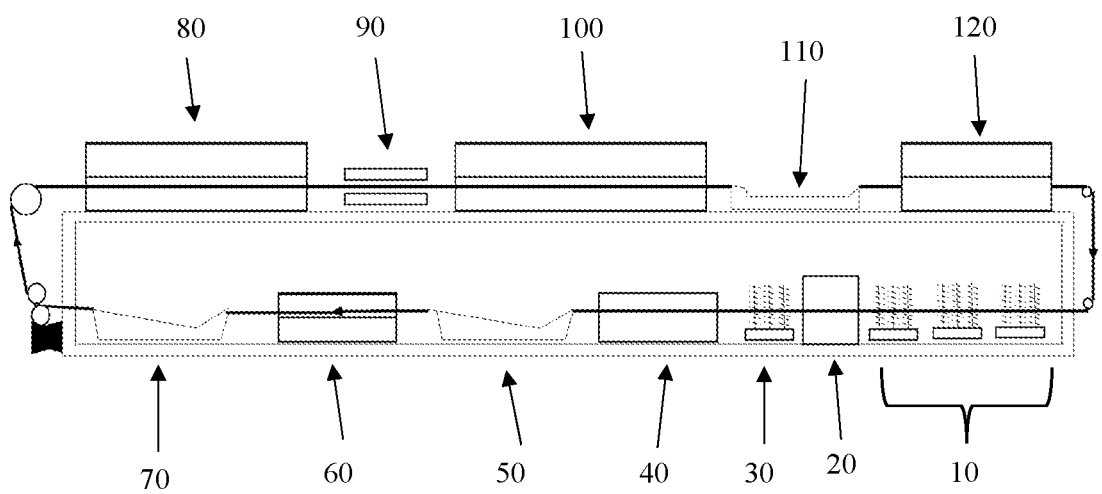

NITRILE RUBBER CONDOMS AND METHODS OF MAKING THEM

FIELD OF THE INVENTION

The present invention relates to elastomeric articles that are made from nitrile rubber formulations. In particular, the invention pertains to nitrile rubber articles that exhibit physical characteristics that are comparable to similar articles made from natural rubber latex. The resultant articles are soft but yet possess adequate mechanical strength to ensure their safe use.

BACKGROUND OF THE INVENTION

Elastomeric articles requiring the highest elongation and greatest ease to stretch, such as surgical or examination gloves, balloons, and condoms have traditionally been made from natural rubber latex. While nitrile rubber products are typically more difficult to stretch, one of the advantages of nitrile rubber over natural rubber latex substrates is that nitrile rubber products do not contain natural latex proteins, which can become a significant allergy issue for some users. Other advantages of nitrile rubber materials over natural rubber latex are that nitrile rubber materials exhibit improved chemical resistance, especially to fatty and oily substances, and improved puncture resistance. Hence, nitrile rubber products have become desirable as a substitute for natural rubber products. However, a hindrance toward making surgical or examination gloves and condoms from nitrile rubber materials is that nitrile rubber traditionally has proven to be stiffer, hence such items are less comfortable to wear as compared to similar types of items made from natural rubber latex materials.

Carboxylated nitrile, which is a terpolymer of butadiene, acrylonitrile, and organic acid monomers, has at least two properties that make it useful for manufacturing elastomeric articles. These two features are high strength and impermeability to certain hydrocarbon solvents and oils. Compounding and curing the rubber (which is used in latex form for, e.g., dipping to provide articles of manufacture such as gloves or condoms) with other ingredients such as curing agents, accelerators, and activators is generally performed to optimize these properties. The level of each monomer in the polymer and the level of curing affect the levels of strength and the chemical resistance in the finished article. Polymers with higher levels of acrylonitrile tend to have better resistance to aliphatic oils and solvents, but are also stiffer than polymers that have lower levels of acrylonitrile. While the chemical nature of the monomers from which the polymer is made offers some degree of chemical resistance, when the polymer molecules are chemically crosslinked, resistance to chemical swelling, permeation, and dissolution greatly increase.

Crosslinking also increases the strength and elasticity of the rubber. Carboxylated nitrile latexes can be chemically crosslinked in at least two ways: the butadiene subunits can be covalently crosslinked with sulfur/accelerator systems; and the carboxylated (organic acid) sites can be ionically crosslinked with metal oxides or salts. Sulfur crosslinks often result in large improvements in oil and chemical resistance. Ionic crosslinks, resulting from, for example, the addition of zinc oxide to the latex, result in a rubber having high tensile strength, puncture resistance, and abrasion resistance, as well as high elastic modulus (a measure of the force required to stretch a film of the rubber), but poor oil and chemical resistance. Many currently available rubber formulations generally employ a combination of the two curing mechanisms. For example, in combination with sulfur and accelerators, carboxylated nitrile latex manufacturers frequently recommend addition of 1-10 parts of zinc oxide per 100 parts of rubber.

SUMMARY OF THE INVENTION

This invention provides elastomeric articles produced by curing a compounded nitrile rubber formulation which in turn comprises nitrile latex, a crosslinking agent, a metal oxide, a vulcanization accelerator, an antioxidant, an alkali agent, and a heat sensitizer. By dipping suitable molds into a bath of this formulation, and curing the nitrile rubber before removing it from the mold, it is possible to prepare highly functional articles made of flexible thin elastomeric films, such as medical gloves or condoms.

In a preferred mode, the nitrile latex is a nitrile butadiene copolymer, more preferably a carboxylated nitrile butadiene copolymer. The preferred crosslinking agent is sulfur, and the preferred metal oxide is a divalent metal oxide, most preferably zinc oxide. The preferred vulcanization accelerator is zinc dibutyldithiocarbamate, and the preferred antioxidant is a butylated reaction product of p-cresol and dicyclopentadiene, the preferred alkali agent is potassium hydroxide and/or ammonium hydroxide. The preferred heat sensitizer is a functional organosiloxane, which more preferably is silane polyether polybutadiene. Typically, the nitrile butadiene copolymer is 85 wt % to 95 wt % of a total of the compounded nitrile rubber formulation; the crosslinking agent is 0.20 wt % to 1.00 wt % of the total of the compounded nitrile rubber formulation; the metal oxide is 0.20 wt % to 1.50 wt % of the total of the compounded nitrile rubber formulation; the vulcanization accelerator is 0.20 wt % to 1.00 wt % of the total of the compounded nitrile rubber formulation; the antioxidant is 0.10 wt % to 1.00 wt % of the total of the compounded nitrile rubber formulation; the alkali agent is 0.01 wt % to 0.25 wt % of the total of the compounded nitrile rubber formulation; and the heat sensitizer is 0.10 wt % to 1.00 wt % of the total of the compounded nitrile rubber formulation.

Generally, this invention provides a method of making an elastomeric article, and the method comprises dipping a mold into a first dip tank containing a compounded nitrile rubber formulation to produce an elastomeric film layer on the mold, the compounded nitrile rubber formulation comprising nitrile butadiene copolymer; a crosslinking agent; a metal oxide; a vulcanization accelerator; an antioxidant; an alkali agent; and a heat sensitizer; then drying and curing the elastomeric film layer to form the elastomeric article. In a particular mode, the method of this invention further comprises passing the elastomeric article through a leaching solution; and stripping the elastomeric article from the mold. Elastomeric articles prepared according to this invention preferably have a thickness in a range of 0.020 mm to 0.050 mm. The compounded nitrile rubber formulation used in the method of this invention typically has components in the proportion described above, and the preferred components are those described above.

BRIEF DESCRIPTION OF THE FIGURE

The FIGURE depicts a schematic diagram of a condom dipping machine.

DETAILED DESCRIPTION OF THE EMBODIMENTS

The invention provides nitrile rubber formulations useful for manufacturing articles having good strength and chemical resistance while being softer (i.e., having a lower elastic modulus) than many previously known rubber formulations. The invention also provides methods of making such nitrile rubber compositions, and articles of manufacture made thereof.

The term "nitrile latex" is art-recognized and refers to a synthetic rubber latex used in the manufacture of elastomers. Nitrile latexes can be carboxylated or noncarboxylated; carboxylated nitrile latexes are preferred.

Compounded Nitrile Rubber Formulation

The elastomeric articles of the present invention are made using a compounded nitrile rubber formulation which is an aqueous slurry comprising a nitrile butadiene copolymer, a crosslinking agent, a metal oxide, a vulcanization accelerator, an antioxidant, an alkali agent, and a heat sensitizer. The compounded nitrile rubber formulation may optionally further comprise a stabilizing agent and/or a crosslinker.

The base polymer employed in the present nitrile material can be a random terpolymer composition containing acrylonitrile, butadiene, and carboxylic acid components. The acrylonitrile content of a blended or combined terpolymer composition can range from about 17% by weight to about 45% by weight, such as from about 20% by weight to about 40% by weight, such as from about 20% by weight to about 35% by weight. The methacrylic acid content should be less than about 15% by weight, preferably about 10% by weight, with butadiene making up the remainder balance of the polymer. The base terpolymer is made through a process of emulsion polymerization, and can be used while still in emulsion form to manufacture the elastomeric articles. Further, the acrylonitrile polymer formulations that may be employed in the present invention can have a glass transition temperature (Tg) ranging from about −30° C. to about −10° C.

In the present invention, the polymer structure preferably includes a random terpolymer (as opposed to block or alternating terpolymer) of acrylonitrile, butadiene, and carboxylic acid. The properties depend on the average molecular weight, the molecular weight distribution, the linearity or degree of branching, the gel content, and the microstructure. Regardless of the particular structure of the nitrile rubber, various additional components can be incorporated during the compounding of the nitrile rubber formulation to obtain an article having the desired properties. Preferably, the content of the nitrile rubber in the compounded nitrile rubber formulation is in an amount from 85 wt % to 95 wt % of the total of the compounded nitrile rubber formulation.

The carboxylated nitrile rubber of the present invention can be chemically crosslinked in at least two ways: the butadiene subunits can be covalently crosslinked with sulfur and accelerators, while the carboxylated (organic acid) sites can be ionically crosslinked with metal oxides or salts. Ionic crosslinks, resulting from, for example, the addition of a metal oxide, such as zinc oxide, to the nitrile rubber formulation, can result in a nitrile rubber formulation having high tensile strength, puncture resistance, and abrasion resistance, as well as high elastic modulus, but poor oil and chemical resistance, which is why a sulfur crosslinking agent can be added to the nitrile rubber formulation, as discussed in more detail below.

A crosslinking agent can also be used in the nitrile rubber formulation to provide oil and chemical resistance to a finished product. Such crosslinking can provide resistance to chemical swelling, permeation, and dissolution. The crosslinking agent can be present in the compounded nitrile rubber formulation in an amount ranging from about 0.20 wt % to 1.00 wt %. Preferably, the crosslinking agent contains sulfur.

Optionally, the nitrile rubber formulation may also include organic crosslinker(s) and/or thickener, such as acrylate-based thickener. Organic crosslinkers include polycarbodiimide, polyglycidyl (epoxy) and/or alkoxymethyl melamine crosslinkers.

The inclusion of a metal oxide in the formulation, such as zinc oxide, improves the dipping qualities and cure rates. Regardless of the particular metal oxide utilized, the metal oxide can be present in the compounded nitrile rubber formulation in an amount ranging from about 0.20 wt % to 1.50 wt %.

A vulcanization accelerator can also be used in combination with the crosslinking agent to provide the desired level of chemical resistance to the finished product. The vulcanization accelerator can be a single dithiocarbamate accelerator that is added with sulfur. However, in other cases where higher levels of chemical resistance are needed, a combination of vulcanization accelerators can be utilized. Such a combination can include a dithiocarbamate, a thiazole, and a guanidine compound. For example, the vulcanization accelerator can be zinc dibutyldithiocarbamate, zinc diethyldithiocarbamate, zinc mercaptobenzothiazole, diphenyl guanidine, or a combination thereof.

Regardless of the particular vulcanization accelerator or combination of vulcanization accelerators utilized, the vulcanization accelerator can be present in the compounded nitrile rubber formulation in an amount ranging from about 0.20 wt % to 1.00 wt %.

Typically, the nitrile rubber formulation will also include antioxidants, such as butylated reaction products of p-cresol and dicyclopentadiene.

An alkali agent can be added to the nitrile rubber formulation to adjust the pH of the nitrile rubber formulation. Any suitable alkali agent can be used, and, in some embodiments, the alkali agent can be potassium hydroxide, ammonium hydroxide, or a combination thereof. In any event, the alkali agent can be used to adjust the nitrile rubber formulation to a pH that can range from about 9 to about 11, such as from about 9.2 to about such as from about 9.5 to about 10.2. In addition to acting as a pH adjuster, the alkali agent can be utilized in combination with a metal oxide as discussed below to facilitate the formation of a nitrile rubber formulation that has high strength. Specifically, the alkali agent can include monovalent ions, such as K, Na, or H, which, although they do not have sufficient electron capacity to accommodate a bond with a second methylacrylic acid unit, may allow for weaker forms of associative bonding. As such, the alkali agents (e.g., monovalent salts) that can be used to increase the pH of the nitrile rubber formulation may also swell the nitrile rubber particles, making more carboxylic acid groups accessible to other crosslinking agents, such as the metal oxides discussed in more detail below. The positive charge of the cation can well balance the negative electrons of the acidic carboxyl groups.

Regardless of the particular alkali agent utilized, the alkali agent can be present in the compounded nitrile rubber formulation in an amount ranging from about 0.01 wt % to wt % of the total of the compounded nitrile rubber formulation.

A heat sensitizer is also used in the nitrile rubber formulation. The heat sensitizer is preferably present in the compounded nitrile rubber formulation in an amount ranging from about 0.10 wt % to 1.00 wt %. The heat sensitizer thickens the formulation and allows for even film formation at small thicknesses. Suitable heat sensitizers include polyetherthioethers, polymethoxy acetals, polyalkozy-1-alkanols. However, preferably the heat sensitizer is selected from a functional organopolysiloxane, ammonium nitrate, polyvinyl methyl ether, and polypropylene glycol. More preferably, the heat sensitizer is a functional organopolysiloxane, such as polyether modified polysiloxane or silane modified polybutadiene. Most preferably the heat sensitizer is a silane-modified polybutadiene.

The compounded nitrile rubber formulation as described above produces an elastomeric article, such as a glove or condom, in a thin film with good elasticity, tactility, transparency/clarity, and superior elongation/softness, while also providing a good viral barrier, and compatibility with a wide range of lubricants including hydrocarbon/organic oil lubricants.

Elastomeric Article Manufacturing Process

The elastomeric articles of this invention, such as condoms or medical gloves for examination or surgery, are manufactured by a process termed straight dipping. An exemplary process of manufacturing a condom is described herein.

Formers or molds of glass or other suitable material having the shape of the desired end product are dipped into one or more baths containing an uncured solution of the compounded nitrile rubber formulation described above. Since the condom is manufactured via straight dipping, the solution mixing or dispersion methods are used. The formers or molds may be of different shapes or sizes, depending on the desired end product.

As shown in the FIGURE, for straight dipping, the formers or molds are cleaned with brushes 10, washed in a mold rinse tank 20 with clean or soft water and then dried in with drying brushes 30 and mold drying oven 40 before dipping into the first dip tank 50 containing the uncured solution of the compounded nitrile rubber formulation. Optionally for coagulant dipping, dried formers will dip into a coagulant bath prior each latex dip tank. Thin layer of coagulant on the mold assists in producing a smoother layer of a nitrile rubber coating on the mold.

After the molds have been withdrawn from the first dip tank 50, they pass through the first oven 60 to dry and pre-cure the film on the mold before going to a second dip tank 70. The molds coated with a thin layer of nitrile rubber film are then passed through a second oven 80 to partially dry and pre-cure the nitrile rubber film. Optionally, the process may include a third dip tank and third pre-curing oven.

The coated molds are then passed through a sets of brushes (known as beading stations 90) to form a bead at the open-end of the condoms on the molds, and then through a curing oven 100 to finally dry the condoms and vulcanize them. Before condom stripping, the coated molds are dipped into a leaching tank 110 that contains warm water and chemicals. The purpose of the leaching tank 110 is to remove water-soluble chemicals from the condoms and loosen the film so that the condom can be stripped off either by brushing or water jet in the stripping station 120. The molds are then washed with fresh water before drying, which completes the whole cycle. The wet condoms collected are then mixed with aqueous powder-slurry to prevent them from sticking together. After wet powdering, the condoms are then spin-dried and tumble-dried at elevated temperature to remove all the water and moisture and also to continue vulcanizing them.

The dried condoms are visually inspected before they are 100% electronically tested by manual placement on aluminum mandrels. During the test, the mandrels rotate against a conductive rubber brush which is counter-rotating. A high voltage electric current is then applied via the conductive brush. As the condom is made of natural rubber which has an insulative property, any pin-hole present on the surface will trigger the test machine to remove it automatically into a reject bin. The good condoms will be rolled up automatically and collected for final packing.

Condoms are then sampled for testing following the established sampling plan and quality acceptance level. Condoms that pass the acceptance criteria are then sent for foiling using a heat sealing machine. Condoms are manually placed on a feeding belt, transported and squeezed automatically into sealing cylinder cells. During this operation, the condoms come in direct contact with heat sealable films which are hermetically sealed. The condoms are pre-lubricated along the feeding belt of the packaging machine with silicone fluid.

Specifications for condoms prepared using the compounded nitrile rubber formulation according the invention described herein can have a 160 mm minimum length or a 170 mm minimum length, a reduced thickness in the range of 0.020 mm to 0.050 mm or 0.030 to 0.039 mm, and a width at the open end of 45 mm to 65 mm, or 53±2 mm, 56±2 mm, or 60±2 mm. The produced condom also has good elasticity, tactility, transparency/clarity, and superior elongation/softness, while also providing a good viral barrier, and compatibility with a wide range of lubricants including hydrocarbon/organic oil lubricants.

As one skilled in the art would appreciate, by using molds suitable for gloves, the method of this invention may be used to produce surgical gloves or medical exam gloves.

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed herein and contemplated for carrying out the process of the invention but that the invention will include all embodiments falling within the scope of the appended claims.

The invention claimed is:

1. A compounded nitrile rubber formulation comprising:
a nitrile butadiene copolymer;
a crosslinking agent;
a metal oxide;
a vulcanization accelerator;
an antioxidant;
an alkali agent; and
a heat sensitizer including silane modified polybutadiene and being 0.10 wt % to 1.00 wt % of a total of the compounded nitrile rubber formulation.

2. The compounded nitrile rubber formulation according to claim 1, wherein the nitrile butadiene copolymer is a carboxylated nitrile butadiene copolymer.

3. The compounded nitrile rubber formulation according to claim 1, wherein the crosslinking agent is sulfur.

4. The compounded nitrile rubber formulation according to claim 1, wherein the metal oxide is a divalent metal oxide.

5. The compounded nitrile rubber formulation according to claim 4, wherein the metal oxide is zinc oxide.

6. The compounded nitril rubber formulation according to claim 1, wherein the vulcanization accelerator is zinc dibutyldithiocarbamate.

7. The compounded nitrile rubber formulation according to claim 1, wherein the alkali agent is potassium hydroxide and/or ammonium hydroxide.

8. The compounded nitrile rubber formulation according to claim 1, wherein the antioxidant is butylated reaction product of p-cresol and dicyclopentadiene.

9. The compounded nitrile rubber formulation according to claim 1, wherein:
the nitrile butadiene copolymer is 85 wt % to 95 wt % of the total of the compounded nitrile rubber formulation;
the crosslinking agent is 0.20 wt % to 1.00 wt % of the total of the compounded nitrile rubber formulation;
the metal oxide is 0.20 wt % to 1.50 wt % of the total of the compounded nitrile rubber formulation;
the vulcanization accelerator is 0.20 wt % to 1.00 wt % of the total of the compounded nitrile rubber formulation;
the antioxidant is 0.10 wt % to 1.00 wt % of the total of the compounded nitrile rubber formulation; and
the alkali agent is 0.01 wt % to 0.25 wt % of the total of the compounded nitrile rubber formulation.

10. A method of making an elastomeric article, the method comprising:
dipping a mold into a first dip tank containing a compounded nitrile rubber formulation to produce an elastomeric film layer on the mold, the compounded nitrile rubber formulation comprising:
a nitrile butadiene copolymer;
a crosslinking agent;
a metal oxide;
a vulcanization accelerator;
an antioxidant;
an alkali agent; and
a heat sensitizer including silane modified polybutadiene and being 0.10 wt % to 1.00 wt % of a total of the compounded nitrile rubber formulation; and
drying and curing the elastomeric film layer to form the elastomeric article.

11. The method of claim 10, further comprising:
passing the elastomeric article through a leaching solution; and
stripping the elastomeric article from the mold.

12. The method of claim 10, wherein the elastomeric article has a thickness in a range of 0.020 mm to 0.050 mm.

13. The method of claim 10, wherein the nitrile butadiene copolymer is a carboxylated nitrile butadiene copolymer.

14. The method of claim 10, wherein the crosslinking agent is sulfur.

15. The method of claim 10, wherein the metal oxide is a divalent metal oxide.

16. The method of claim 10, wherein the vulcanization accelerator is zinc dibutyldithiocarbamate.

17. The method of claim 10, wherein the alkali agent is potassium hydroxide and/or ammonium hydroxide.

18. The method of claim 10, wherein the antioxidant is butylated reaction product of p-cresol and dicyclopentadiene.

19. The method of claim 10, wherein:
the nitrile butadiene copolymer is 85 wt % to 95 wt % of the total of the compounded nitrile rubber formulation;
the crosslinking agent is 0.20 wt % to 1.00 wt % of the total of the compounded nitrile rubber formulation;
the metal oxide is 0.20 wt % to 1.50 wt % of the total of the compounded nitrile rubber formulation;
the vulcanization accelerator is 0.20 wt % to 1.00 wt % of the total of the compounded nitrile rubber formulation;
the antioxidant is 0.10 wt % to 1.00 wt % of the total of the compounded nitrile rubber formulation; and
the alkali agent is 0.01 wt % to 0.25 wt % of the total of the compounded nitrile rubber formulation.

* * * * *